Feb. 7, 1967   A. KOFFLER   3,302,639
RECORDING DIAGNOSTIC MACHINES
Filed June 23, 1964   2 Sheets-Sheet 1
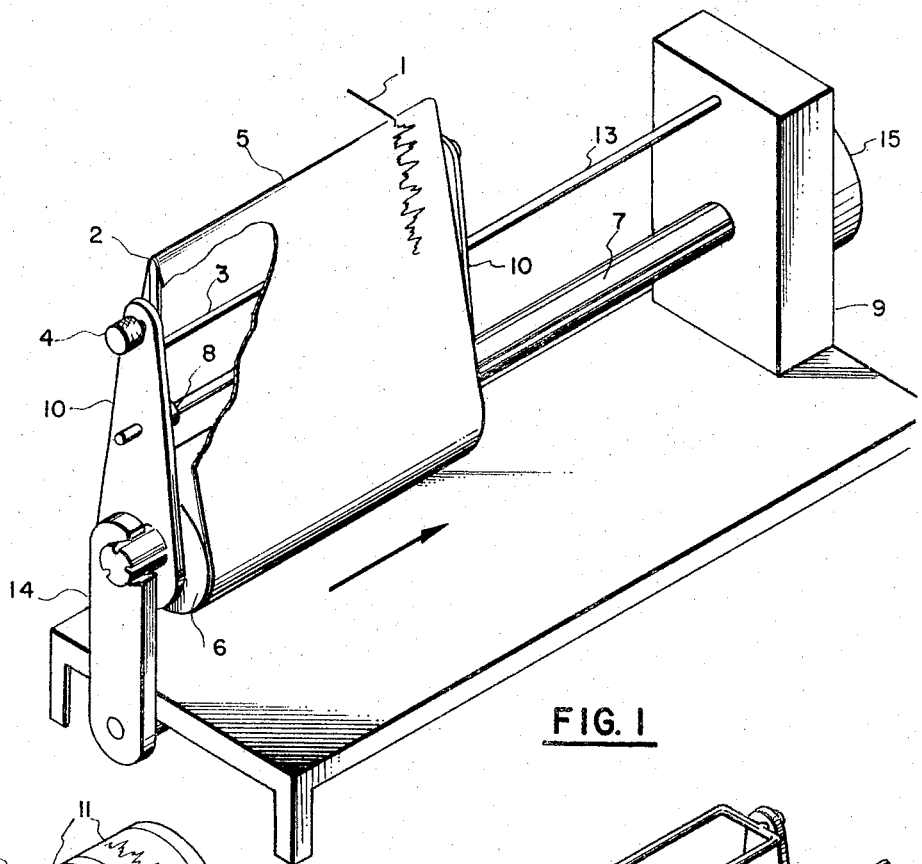
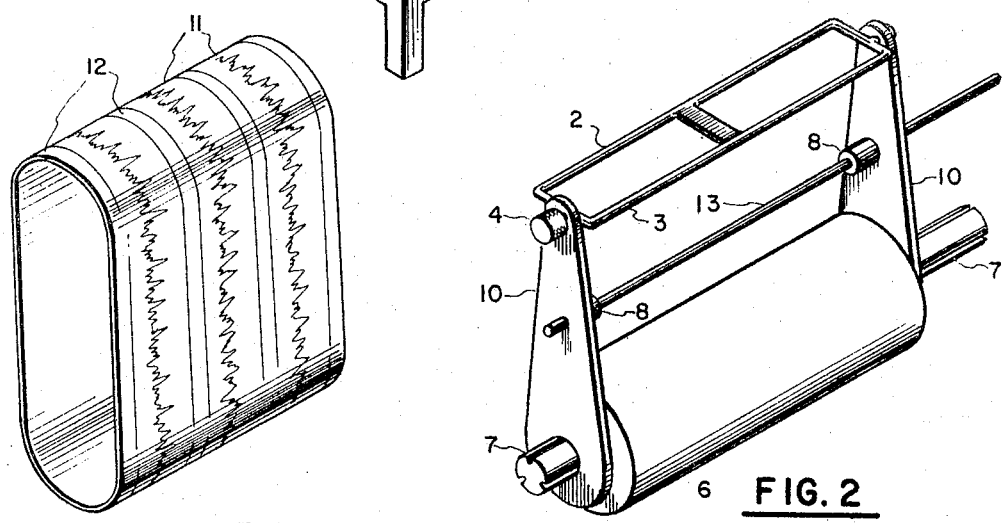
INVENTOR
ARTHUR KOFFLER
BY
Robert Ames Nolr
ATTORNEY

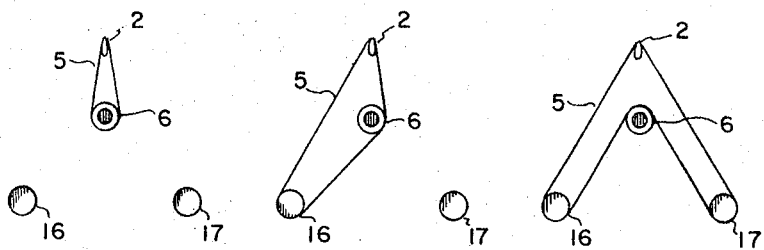
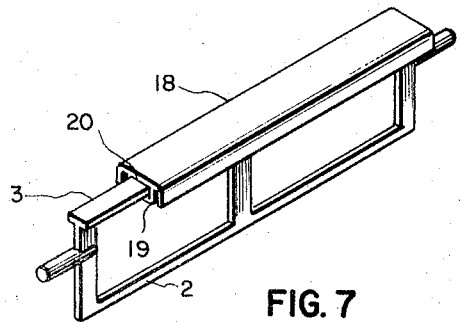
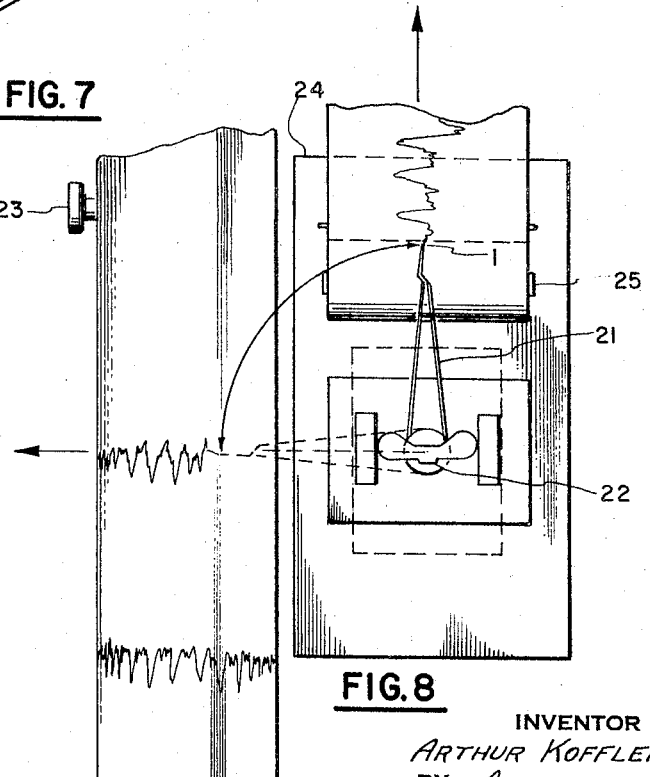
INVENTOR
ARTHUR KOFFLER
BY
ATTORNEY

United States Patent Office 3,302,639
Patented Feb. 7, 1967

3,302,639
RECORDING DIAGNOSTIC MACHINES
Arthur Koffler, 87 Bartina Lane, Stamford, Conn. 06902
Filed June 23, 1964, Ser. No. 377,188
7 Claims. (Cl. 128—2.06)

This invention relates to improved diagnostic machines for recording physiological and other responses capable of representation by electrical quantities and more particularly improved diagnostic machines in which a recording means is provided for making trace records on a loop or belt, end to end and/or preferably side by side for sequential tests. The invention also includes detailed new construction of the recorder itself.

Many diagnostic machines have been developed in which various physiological responses have been translated into electrical quantities, such as currents or voltages, and these drive a stylus or other recording means over a recording surface in a recorder. One of the most important types of diagnostic machines is an electrocardiograph which in the remainder of the specification will be abbreviated in the customary manner EKG. Other types of instruments are electroencephelographs, sphygmographs, polygraphs and the like. In practically all EKG's and in many of the other diagnostic machines it is necessary to record traces of successive tests. Thus for example, in an EKG where the recording medium is a continuously moving tape as will be described below in conjunction with a specific illustrative example of the invention, it is customary to record first between two electrodes, then between another pair and finally from a moveable chest eletcrode. Sometimes fixed electrode pairs have been recorded in a group of several traces at the same time, side by side. But in every case it is necessary to record some of the tests sequentially. It is then customary to mount carefully the EKG traces side by side or one below the other in order to compare one with another as the resulting comparison is an important part of the diagnosis. This selective mounting requires professional skill and can constitute a substantial increase in cost per patient for electrocardiography.

Similar problems are encountered in electroencephelographs, where sometimes waves are of different frequency and sequential recording is sometimes desirable. Sphygmographs may also require records after the patient has exercised or otherwise has altered his blood pressure and pulse rate. The problem is less acute in polygraphs though still present in some modifications.

The present invention solves completely and automatically or semiautomatically the above problems. Essentially in the present invention a loop or belt of recording paper or other recording medium is employed of suitable length so that it may, after information has been recorded, be cut into the predesigned length of the loop or belt, and other multiples, depending on test and be then displayed as sheets with the recorded information already in proper, predesignated place on the sheet. This sheet can then be made part of the hospital or office record of the patient. If used for non-clinical applications this sheet can be filed in standard files. After the first trace or set of traces have been recorded and before the next trace or set of traces are recorded, the belt is caused to be displaced laterally. Thus the sequential traces will appear side-by-side on the recorded medium and of course will be exactly aligned. After the tests have all been made the loop is then cut.

One cut or two in the case of longer loops, are made and the whole record is then at once available, without further preparations, as all sequential traces have already been properly placed in their predetermined locations on paper or other media of correct size for study, and for filing. There is no necessity, as in the past, of cutting off sections of tape at exactly the right points and of the right lengths, and mounting them individually into a viewing and filing card. Savings of time of the skilled professionals, such as a physician or assistant are from 8 to 10 minutes, or even more in the case of EKG traces, and comparable savings can be obtained in the case of other diagnostic machines.

Thus the recorded information sequentially received becomes its own display sheet or display folder having the advantages enumerated above.

The invention will be described in greater detail in conjunction with an EKG using a modern recording medium of laminated type, in which a dark colored backing is revealed, for example, when the recording stylus renders the front lamination transparent by the application of heat. It will be noted that for diagnostic machines the improvement need not be limited to any particular recording surface; and photographic, pen and ink and other forms may be used. The specific description will be in conjunction with such modern laminated recording paper which is now standard in EKG's.

The description is in conjunction with the drawings in which:

FIG. 1 is an isometric view of the recording portion of an EKG;

FIG. 2 is another isometric view of the recording mechanism itself without a recording medium;

FIG. 3 is an isometric view of a particular type of recording means in endless belt or loop form;

FIGS. 4 to 6 are diagrammatic views of a modified roller mechanism with three different lengths of loop or belt;

FIG. 7 is an isometric view of a modified recording mechanism and

FIG. 8 is an isometric view of part of a standard EKG with the recording mechanism of the present invention as an attachment.

As the present invention need make no change whatsoever in the electronic portion of the EKG or no substantial changes, this part of the machine is not shown in the first figures so that the novel portion of the improvement may be illustrated more clearly. When the machine is turned on a heated stylus 1 is moved sideways in accordance with the voltages between the electrodes after amplification in the standard amplifying section of the EKG. The stylus bears on a belt or loop 5 of laminated paper in which there is a dark backing with a front lamination which can be rendered transparent in contact with the heated stylus. The paper is firmly held and passes over a highly polished chrome plated bar 2 and is driven by a roller 6 movable sideways on a splined shaft 7 which is driven by suitable gearing 9 by a motor 15.

When the EKG is turned on to produce a trace the motor 15 is started, the belt 5 moves and the fluctuating voltages between the electrodes cause the stylus to move from side-to-side. A standard EKG trace is produced. The starting of the drive is by a suitable switch on the EKG console in the normal manner. This part of the machine is not substantially different from that of an ordinary EKG. A trace is registered on the loop or belt 5 to about half its length, in the case of a belt to be cut into two pieces, or a quarter of its length where it is to be cut in four pieces. This length may advantageously be of the order of magnitude of six to eight inches which is the usual length of a mounted EKG trace on ordinary, continuously running tape. The EKG can then be set to record between another pair of electrodes and the drive started again, which will produce a second trace on the other half of the belt. Then the belt is moved sideways, as will be described below.

The roller 6 moves on the splined shaft 7 and at its ends carries frames 10 in which are journaled the two rods 2 and 3 which can be turned by a knurled knob 4. This can be seen very clearly in FIG. 2 where the rods 2 and 3 are turned to the depressed position for change of a belt. The frames 10 are moved by spacers 8 on a shaft 13. In the drawings this movement is shown as being effected electrically, which may be by a step by step push button on the EKG console (not shown) or the sideways movement may be effected manually. In either case the sideways displacement is sufficient so that there is room for the next EKG trace. The machine is then connected between another pair of electrodes, the drive started and the cycle described above is then repeated as many times as desired.

The knurled knob is given a quarter turn so that the loop 5 is loose and a support 14 for the end of the splined shaft 7 is swung to the left and the loop or belt 5 then removed and a new loop replaced. The support 7 is then swung back into the position shown in FIG. 1, the knurled knob 4 given a quarter turn which brings the polished rod 2 under the stylus and stretches the belt 5 tight and the machine is ready to record another series of EKG traces.

The belt which is then removed and cut into halves or quarters. These then provide immediate displays of the several separate sequential recordings, and make unnecessary the former mounting of a large number of sections of the ordinary EKG tape. The belt may be cut once only and then by turning inside out a folder is formed with all recordings in place. The other side may be imprinted and inscribed. The folder may have suitable printing to identify the different traces and a place for recording patient's name, time of test and other information. There is thus a complete folder of the EKG traces without the laborious skilled labor of selecting particular sections of tape, cutting them, mounting them, and making the necessary notations. As pointed out above, savings of from 10 to 15 minutes per EKG record are obtainable. At the same time each trace is exactly opposite each other trace and skilled mounting of sections of the EKG tape is eliminated. At the same time there is no possibility of selecting the wrong parts of the tape for mounting, or of mislabeling the traces as actually recorded, or of mixing on one sheet the traces actually recorded from two different patients.

The present invention can be applied to old EKG's and is illustrated below in FIG. 8. This creates a very marked and important flexibility as the invention becomes equally applicable to new machines and to old.

The belt becomes its own folder when turned inside out. If the loop is long enough, it may accommodate four or more sequential traces in one revolution, instead of two. In that case of course two cuts are made, and two halves of the belt are available for filing.

For some purposes it is desirable to have notations on the recording medium itself; this can readily be effected because normally the size of the belt is such that there is room for more than the ordinary number of EKG traces. In such a case a special recording medium may be used with stripes of stylus responsive material each separated by a narrow strip of nonrecording paper. This is illustrated in FIG. 3 where the wider recording stripes are shown at 11 and the narrow blank stripes at 12. On the blank stripes there can of course be printed any information which is desired in more detail and of course notes can be made by the doctor when he examines the final record opposite the exact points on the trace or traces where a particular result appears.

FIGURES 4 through 6 show in purely diagrammatic form a modified arrangement of rollers in the recording mechanism. Corresponding elements will carry the same reference numerals as in FIGS. 1 and 2. Instead of a large drive roller 6 there is a smaller roller 6 which with the backing rod 2 and two idler rollers 16 and 17 forms a triangle with the drive roller somewhat centered. The belt or loop 5 is shown as going around drive roll 6 and rod 2 in FIG. 4 which corresponds to one length of belt. FIG. 5 shows the belt going around rod 2, drive roll 6 and idler 16 for an intermediate length and FIG. 6 shows the belt going from the rod 2 around idler 17, up over drive roll 6 and then around idler 16 back to the rod 2. There is thus provided three different lengths of belts and as the belts are easily slipped on as has been described in conjunction with FIGS. 1 and 2, size can be changed at will. The possibility of having three lengths of belts adds desirable flexibility to the mechanism of the invention as it then becomes possible to use much longer belts where EKG's of longer duration are needed, for example, in cases of serious cardiac arrhythmia. Because of the versatility of the modification of FIGS. 4 to 6 this is preferable in many cases.

FIG. 7 shows a detail of a modification which permits the choice of either an extended flat backing surface or the rod 2 of the foregoing figures. The rod 3 is formed as a rectangle instead of a round shape as is shown in FIG. 2 and a flat backing surface 18 slides onto it with a partially enclosing portion 19. The flat surface can easily be slid on when a belt is changed and the size of the flat surface is such that in conjunction with the shorter spacing of the rod 3 from the axis turned by the knob 4 the tension on the belt will be the same as when the rod 2 which is further from the axis is swung in. The member 19 has a slot 20 so that when it is slid onto the rod 3 the stiffening cross bar shown in FIG. 2 engages the slot and permits the member 19 to be slid the full length of the rod 3. Sometimes traces are best made on a more extended flat surface and so the possibility of adapting the present invention which is shown in FIG. 7 is of value where a more versatile machine is desired.

FIG. 8 shows a portion of a standard EKG including the stylus 1, its lever arm 21 and the standard tape recording mechanism of an EKG, the tape being shown as wound at 25. When the machine operates in its standard form, the tape passes under the stylus 1 whenever the machine is in operation. The only difference in this part of the standard EKG machine is that instead of the lever arm 21 with its magnetic actuating element (which since they are standard are not shown), pivoting about a fixed pivot, a movable pivot is provided at 22 so that the arm can be turned at 90°. In this new position it bears on the belt 5 of a recording mechanism of the present invention. Since the other parts of the recording mechanism do not differ from those described in the foregoing figures except in one respect which will be referred to below, the mechanism will not be further described in detail but the elements carry the same reference numerals as they do in the earlier figures. The only difference is that the recording mechanism is mounted on small wheels 23 which move on a side bracket 24 which is bolted on the EKG. Of course it makes no difference whether a recording paper is moved by moving the whole recording mechanism carriage or by sliding the drive roller on a spline shaft. In each case the same sideways movement is obtained and the side-by-side EKG trace is produced in the same manner. In FIG. 8 the stylus 1 and arm 21 in the position in which it contacts the belt 5 are shown in dashed lines.

FIG. 8 illustrates a very desirable modification for existing EKG's because it is unnecessary to rebuild the machine at all except to provide for turning the stylus lever arm 21 into either of two positions. The fact that the invention can be used without rebuilding the machine opens up a wide field of utility for existing EKG's. Even in new machines there is an advantage in the modification shown in FIG. 8 although in a new machine it is not necessary to provide a mounting bracket as this can be designed into the bed of the machine at the start and also it is not necessary, or at least as necessary, that the recording mechanism be removable and therefore the type shown in FIG. 1 in which the roller can move on the spline shaft can be used if desired.

The foregoing description has been in conjunction with a diagnostic machine and in particular an EKG as this is the most important single field of utility of the combination of the invention. It is in this field that the greatest time savings are obtained. The accurate side by side alignment of sequential traces is of course obtained regardless of how the stylus is driven. Similarly the means for loosening the loop or belt and removing it without smudging is also not limited to recorders on diagnostic machines. Therefore in this aspect of the invention the subcombination is included generally, without limitation to the preferred main combination with a diagnostic machine.

It has been proposed to construct EKG's with multiple recording styli. Thus for example a machine can record simultaneously traces from three or more pairs of electrodes side by side on the same tape which moves out of the machine continuously, exactly as does the conventional single trace EKG tape. However, it is normally not practical however to record all of the EKG voltages simultaneously, because certain of the electrodes are normally not fixed. Thus the chest data have to be recorded from different chest sites by the person who is taking the electrocardiogram. The same problem is encountered in selecting and mounting particular portions of the EKG tape. Furthermore even when several of the traces are grouped it is still often necessary to make sequential tests. Where there has been multiplexing of the recording the time taken may be somewhat reduced. The present invention is of course equally useful for instruments in which some of the records are made simultaneously. Of course in such a case a movement must be suitable so that if there are a series of multiple traces the styli will not make records over another trace. This in no way complicates the present invention, it merely requires that the lateral repositioning shift of the loop or belt be greater between recordings than recordings made with single traces for the chest electrodes where the amount of repositioning shift for the latter need only be a single trace wide.

The loop or belt which has been described is in the form of laminated paper. This is a conventional type of recording medium for EKG traces. However the invention is not concerned with the exact medium which may be plastic, electrosensitive paper, photosensitive paper or the like. All that is required is that the medium be capable of fabrication in the form of an endless belt or loop and of serving as a record for filing when cut. Obviously of course the particular paper used must be compatible with the driving rollers and the writing surface and stylus. Certain types of recording means, such as for example, photosensitive recorders are often produced in the form of films with sprocket holes on one or both edges. Such belts may be used in the present invention, obviously of course with rollers of suitable form having teeth of the correct size and location.

In the various drawings the invention has been illustrated but the drawings are of course not working drawings. In an actual machine, naturally, the belts must be of definite sizes and widths. Where a single size of belt is used as in FIGS. 1 to 3, this size may advantageously be 17" in length and approximately 11" wide. When cut once, this constitutes a folder or if cut in halves, two singles result, both of which forms can be filed in normal filing equipment. It should be understood, however, that the invention, as such, is not concerned with the exact dimensions of the recording loops or belts. It will be understood, and should be obvious, that when a loop or belt is cut it will ordinarily be turned inside out to form a folder in which the traces are on the inside and are protected when filed. It is an advantage of the present invention that where the belt is of greater length it can be cut one or more times to form a series of folders. Where the modification illustrated in FIGS. 4 to 6 is used the folders will also be of different sizes. However the widths of belt, length when filed, may be maintained constant and this is advantageous as in most filing equipment this dimension is the determining factor.

I claim:

1. In a diagnostic machine in which at least one physiological condition is transformed into electrical quantities which actuate at least one recording stylus over a moving recording medium and which machine requires making a series of traces on the moving medium, the traces for each physiological condition having the same relative scale, the improvement which comprises, in combination with said machine,
    (a) an endless belt recording medium under the stylus, means for driving said medium in its circumferential direction through a series of single revolutions, thus producing a separate trace for each revolution,
    (b) means for temporarily stopping the said circumferential movement at the end of each revolution, and
    (c) means for laterally translating the medium by the amplitude of at least one trace.

2. An improved diagnostic machine according to claim 1 comprising in addition to the elements cited in sections (a), (b) and (c), there is provided (c) means for eccentrically moving a backing member under the stylus within the recording medium whereby in one position the belt is held taut and in another position there is slack so that the medium can readily be removed without undesired stylus marking and a new medium inserted.

3. An improved diagnostic machine according to claim 2 in which the recording medium is laminated with a dark rear lamination and a front lamination transformable into transparency by heat, and the means for producing slack in the medium comprises a polished member serving as a backing plate for the stylus, the latter is heated, and means for rotating said polished member about an axis eccentric to the center of rotation of the medium whereby the member is movable creating a slack.

4. An improved diagnostic machine according to claim 3 in which the means for moving the recording medium comprises a roller, axially movable on a shaft, disengageable means for supporting one end of the shaft whereby once said means is disengaged the recording medium can be slipped off the end of the roller.

5. An improved diagnostic machine according to claim 1 in which the means for moving the endless recording medium comprises a driving roller and two idler rollers in the form of a triangle with the driving roller at the apex whereby three different lengths of recording media can be accommodated without reconstruction of the driving means.

6. In an improved electrocardiograph in which cardiographic voltages between various electrodes are amplified and a recording stylus on a driving lever is driven in accordance with the amplified signal thus produced, a recording tape over which the stylus moves laterally and means are provided for moving the tape continuously at right angles to stylus movement whereby a trace is produced, the improvement which comprises:
    (a) pivot means about which stylus and driving lever therefor are movable to two positions, one of which is over the recording tape and the other substantially at right angles,
(b) a recording medium according to claim 1 registering with the recording stylus at the position at right angles to the stylus position on the recording tape, and
(c) separate driving means for the recording medium.

7. An improved electrocardiograph according to claim 6 in which the endless belt recording medium is mounted on a bracket adapted to be physically attached to the side of the electrocardiograph.

References Cited by the Examiner

UNITED STATES PATENTS

| 2,718,224 | 9/1955 | Apstein | 128—2.06 |
| 3,130,931 | 4/1964 | Hautly | 242—55 |
| 3,173,743 | 3/1965 | Weissensteiner | 346—33 |
| 3,215,136 | 11/1965 | Holter et al. | 128—2.06 |

RICHARD A. GAUDET, *Primary Examiner.*

SIMON BRODER, *Examiner.*